United States Patent
Sun et al.

(10) Patent No.: US 7,048,771 B2
(45) Date of Patent: May 23, 2006

(54) DYEING TEXTILES USING NANOPARTICLES

(75) Inventors: Gang Sun, Davis, CA (US); Dapeng Li, Davis, CA (US)

(73) Assignee: University of California, Oakland, CA (US)

( * ) Notice: Subject to any disclaimer, the term of this patent is extended or adjusted under 35 U.S.C. 154(b) by 53 days.

(21) Appl. No.: 10/037,785

(22) Filed: Oct. 22, 2001

(65) Prior Publication Data

US 2003/0106160 A1 Jun. 12, 2003

(51) Int. Cl.
*D06P 1/673* (2006.01)

(52) U.S. Cl. .............................. 8/637.1; 8/618; 8/918; 8/922; 8/924; 8/927

(58) Field of Classification Search .................. 8/618, 8/637.1, 493, 115.51, 116.1, 128.1, 115.54, 8/494, 495, 115.6
See application file for complete search history.

(56) References Cited

U.S. PATENT DOCUMENTS

| | | | |
|---|---|---|---|
| 5,118,528 A | | 6/1992 | Fessi et al. |
| 5,133,908 A | | 7/1992 | Stainmesse et al. |
| 5,240,466 A | * | 8/1993 | Bauer et al. |
| 6,136,044 A | * | 10/2000 | Todd |
| 6,516,633 B1 | | 2/2003 | Erskine et al. |
| 6,645,569 B1 | * | 11/2003 | Cramer et al. .............. 427/466 |

| | | | |
|---|---|---|---|
| 2003/0013369 A1 | * | 1/2003 | Soane et al. |
| 2003/0082379 A1 | * | 5/2003 | Hrubesh et al. |

FOREIGN PATENT DOCUMENTS

| | | | |
|---|---|---|---|
| CN | 1123350 | * | 5/1996 |
| CN | 1241662 A | * | 7/1999 |
| CN | 1293278 | * | 11/2000 |
| CN | 1306117 | * | 8/2001 |
| FR | 2799392 | * | 4/2001 |

OTHER PUBLICATIONS

English translation of CN 1306117A, Aug. 1, 2001.*
English translation of CN 1241662A, Jan. 19, 2000.*
Lvov et al.; "High-speed multilayer film assembly by alternate adsorption of silica nanoparticles and linear polycation," *Chem. Commun.*, 1998, pp. 1229-1230.
Deki et al.,; "Dispersion of nano-sized gold particles into polymers: dependence on terminal goups of polymers and morphology of vapor-deposited gold"; *J. Mater. Chem.*, 1999, vol. 9, pp. 943-947.
Akamatsu et al.; "In Situ Spectropscopic and Microscopic Study on Dispersion of Ag Nanoparticles in Polymer Thin Films," *J. Phys. Chem. B*, 2000, 104, pp. 10168-10173.

* cited by examiner

*Primary Examiner*—Margaret Einsmann
(74) *Attorney, Agent, or Firm*—Townsend and Townsend and Crew LLP

(57) ABSTRACT

The present invention employs the use of nanotechnology to textile coloration. The textiles so produced have good fastness and greatly reduce environmental concerns. The present invention provides nanoparticle processed textiles, formulations and methods for producing them.

12 Claims, 5 Drawing Sheets

A

B

A

B

DYEING TEXTILES USING NANOPARTICLES

BACKGROUND OF THE INVENTION

Dyeing is a process of adding colorant molecules to textiles and then permanently holding these molecules inside the fabrics under certain kinds of washing conditions. Using this process, the desired colors can be generated (see, J. Marshall, *Physical Chemistry Essential to Dyeing Theory*, in *The Theory of Coloration of Textiles*, "Ed. C. L. Bird and W. S. Boston" (SDC, Bradford, 1975); H. Zollinger, *Color Chemistry* (VCH, Weinheim, 1991); P. R. Brady, *Rev. Prog. Coloration*, 22:58 (1992)). To fulfill the dyeing purpose, it is preferable that the colorant molecules be both soluble in water and interact with the textile's polymeric molecules. Dissolution of colorants consumes huge amounts of water and then the same volume of wastewater is produced after the dyeing operation (see, S. Papic et al, *J. S. D. C.*, 116(11):52 (2000); V. V. Konovalova et al, *Bioprocess Engineering*, 23(6):52 (2000); J. Sarasa et al, *Water Research*, 32(9):721 (1998); P. Cooper, *J. S. D. C.*, 109:7 (1993)). The colored wastewater is treated before being discarded into the environment, which adds even more costs to the products. In addition, the variety of fiber forming polymer structures requires a comparable large number of colorant molecules to interact, and thus generate the proper colors with the desired durability in the fibers. The selection of both the dyes and the dyeing conditions is therefore complicated and varies from one fabric to another. The problem of multiplicity of dyeing, becomes even more serious in the case of dyeing blended fabrics with a solid color effect, as the dyeing operation has to proceed in multiple steps with different dyes of the same exact color being employed in each step of the coloration process (see, J. Shore, *Dyeing of Blends*, in *The dyeing of Synthetic-Polymer and Acetate Fibers*, "Ed. D. M. Nunn (The Dyers Company Publications Trust, Bradford, SDC" p. 409 (1979)).

Pigments, another group of colorants, can be categorized as being either organic or inorganic, and are regarded as being both insoluble in water and having no interactions with polymeric textiles (see, H. Zollinger, *Color Chemistry* (VCH, Weinheim, 1991); W. Herbst et al., *Industrial Organic Pigments* (VCH, Weinheim, 1993); G. Buxbaum, *Industrial Inorganic Pigments* (Wiley-VCH, Weinheim, 1998)). Pigments, especially inorganic pigments, have been widely used in applications including coatings, printings, and paintings. When pigments are used for the coloration of textiles, various processes are employed including pigment padding, batch exhaustion, and pigment printing. These processes sometimes include binders, solvents, and other optional additives (see, W. Herbst et al., *Industrial Organic Pigments* (VCH, Weinheim, 1993); G. Buxbaum, *Industrial Inorganic Pigments* (Wiley-VCH, Weinheim, 1998); S. R. Khanna, *Colourage*, 39(3):13 (1992); J. R. Aspland, *Textile Chem. Color.*, 25(10):31 (1993); A. H. Tabba et al., *Textile Chem. Color. & American Dyestuff Reporter*, 32(2):30 (2000); W. Schwindt et al., *Rev. Prog. Coloration*, 14:166 (1984)). Using these techniques, the coloration occurs at the surface of the fabrics between the textile polymers and the pigment molecules, wherein mechanistically, the binders serve as a bridge. This particular mechanism adds limitations to this method of coloration.

More recently, pigment dyeing has been developed and applied to cotton coloration (see, T. Lever, *J. S. D. C.*, 108:477 (1992)). It is actually not really "dyeing" in a true sense, but the garments colored this way can produce a unique and fashionable "washed-down" or "ready-worn" look similar to that of the stone-wash effect popular on denim wear. Synthetic fibers however, seem more difficult to be colored through pigment dyeing.

The traditional dyeing technique in which water serves as the medium for carrying dyes to polymeric textiles produces a great volume of colored and/or toxic wastewater and costs millions of dollars for treatment (see, H. Zollinger, *Color Chemistry* (VCH, Weinheim, 1991); A. Reife et al., *Textile Chem. Color. & American Dyestuff Reporter*, 32(1):56 (2000); Q, Zhou, *Bull. Envion. Contam. Toxicol.* 66(6):784 (2001); W. Herbst et al., *Industrial Organic Pigments* (VCH, Weinheim, 1993); G. Buxbaum, *Industrial Inorganic Pigments* (Wiley-VCH, Weinheim, 1998)). New technologies with different mechanisms of coloration are certainly needed.

Nanoparticles are used in materials such as dispersions and coatings, which are used to make films and paints. A major use of bulk nanoparticles is in high surface area materials. These include catalysts, porous membranes, molecular scale filters, sieves such as zeolites, materials used in combustion processes such as rocket fuels, and other applications such as energy storage and sensors. However, nanoparticles have not been used in the dyeing of textiles.

In view of the foregoing, new colored textiles as well as innovative dyeing methods are needed having good fastness without the environmental liabilities. The present invention satisfies these and other needs.

BRIEF SUMMARY OF THE INVENTION

To circumvent and overcome the problems of existing textile coloration methods, the present invention employs the use of nanotechnology in textile coloration. The textiles so produced have good fastness and greatly reduced environmental concerns. As such, in one embodiment, the present invention provides a nanoparticle processed textile and polymer system, the nanoparticle processed textile and polymer system comprises: a textile material having an embedded nanoparticle. The nanoparticle can be an organic nanoparticle or inorganic nanoparticle.

In another embodiment, the present invention provides a nanoparticle formulation for textiles, the formulation comprising: a nanoparticle; a dispersant; and optionally a thickener. The dispersant can be a surfactant such as an anionic surfactant, a cationic surfactant, a nonionic surfactant, or a zwitterionic surfactant.

In yet another embodiment, the present invention provides a method for making a nanoparticle processed polymer composition, the method comprising: diffusing a nanoparticle into a polymer matrix to form an embedded nanoparticle in the polymer matrix, thereby making the nanoparticle processed polymer composition. The nanoparticle processed polymer composition can be a nanoparticle textile.

Numerous benefits are achieved by way of the present invention over conventional techniques. For example, using the present invention for textile coloration, fewer environmental concerns arise compared to traditional dyeing techniques. The release of wastewater otherwise unavoidable is largely diminished, and the cost of the post-treatment of colored wastewater is minimized. By replacing the complicated operations for dyeing textiles, particularly for blends, the necessity of producing thousands of water-soluble dyes with different colors is eliminated.

Besides the huge impact on the textile industry, the present invention provides chemical modification to produced functional polymers. By means of a controlled incorporation of modifying agents in the form of nanoparticles into the substrate, i.e., the polymer matrix, novel materials are developed. Various additional objects, features and advantages of the present invention can be more fully appreciated with reference to the detailed description and accompanying drawings that follow.

DETAILED DESCRIPTION OF THE INVENTION

I. General

Nanotechnology is the ability to work at the molecular level, atom by atom, to create large structures with fundamentally new molecular organization. Compared to the behavior of isolated molecules of about 1 nm ($10^{-9}$ m) or of bulk materials, behavior of structural features in the range of about $10^{-9}$ to $10^{-7}$ m (1 to 100 nm—a typical dimension of 10 nm is 1,000 times smaller than the diameter of a human hair) exhibit important changes. Nanotechnology as used herein, is concerned with materials and systems whose structures and components exhibit novel and significantly improved physical, chemical, and biological properties, due to their nanoscale size. The textile systems, formulations and methods of the present invention possess advantageous properties, which are intrinsic to certain of their nanoscale components.

II. Textiles

Figure 1:
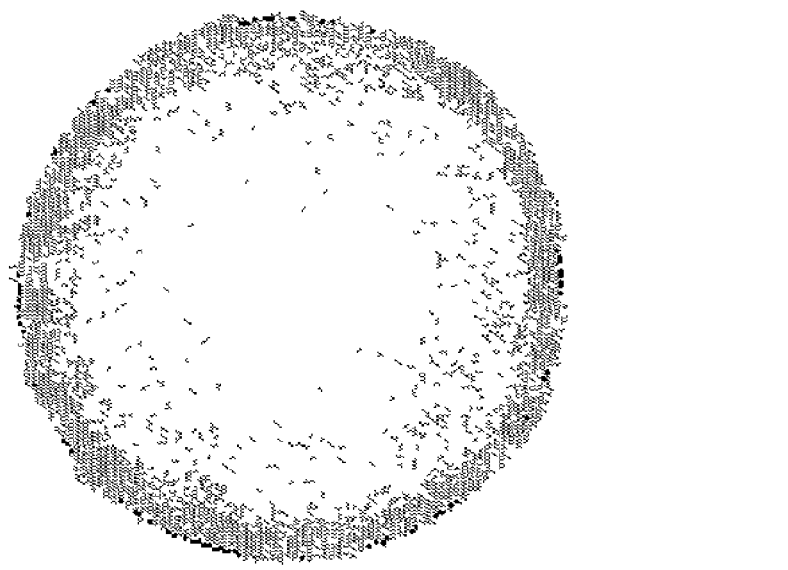
FIGS. 1A–B show one embodiment of diffusion of nanoparticles using the methods of the present invention; Panel A shows a top cross-sectional view of diffusion of nanoparticles into a polymer fiber by applying the nanoparticles from the fiber surface and Panel B shows a portion of a cross-section of a polymer film surface showing diffusion of nanoparticles into a polymer film applying the particles from the top surface.
Figure 1:

In certain embodiments, the present invention provides a nanoparticle processed textile and polymer system, comprising: a textile material having an embedded nanoparticle. As used herein, the phrase "embedded nanoparticle" preferably means that a nanoparticle has diffused into the free volume of the polymer matrix of the textile. As shown in FIG. 1A, in the present invention, the majority of the "embedded nanoparticles" are close to the surface of the polymer or fiber. Preferably, at least about 60% to about 70% of the embedded nanoparticles which have diffused into the polymer are present just below the surface of the polymer, more preferably at least about 70% to about 80%, and most preferably, at least about 80% to about 90% of the nanoparticles embedded in the polymer or fiber are close to the surface of the polymer. As used herein, the phrase "close to the surface" means that the nanoparticles which have diffused into the polymer are not widely or evenly distributed throughout the polymer or fiber, but remain closely packed at the surface of the polymer or fiber. It is believed that the diffusion is controlled by the concentration difference of the substrate and thus, the particles stay in a gradually diluted pattern from the surface to the core of the fiber. In other words, in a distribution profile, the particles show high density at the surfaces, with a gradual decreasing density toward the core of the fiber or polymer. In certain aspects, the amount of embedded nanoparticle per textile is about 0.1% to about 20% (w/w) and more preferably about 0.5% to about 5% (w/w).

A wide range of textiles are suitable for use in the present invention. Such textiles include, but are not limited to, cellulose, cotton, linin, hemp, jute, ramie, wool, mohair, vicuna, silk, rayon, lyocell, acetate, triacetate, azlon, acrylic, aramid, nylon, olefin, polyester, spandex, vinyon, vinal graphite, NOMEX®, KEVLAR®, KERMEL®, metallic textiles, ceramic textiles and mixtures thereof. These textiles can be in the form of fabrics, yarns and fibers. NOMEX®, KEVLAR®, KERMEL®, are aramid fibers manufactured by Dupont and Rhodia Kermel. They are inherently resistant to flames, dissipate static, and are resistant to many chemicals including organics, acids, and bases. Those of skill in the art will know of other textiles suitable for use in the present invention.

In certain aspects, the textile material of the present invention is a fabric such as cellulosic material, a cellulosic-synthetic blend material, or a synthetic material. In certain preferred aspects, the fabric is cellulosic. The cellulosic material can be fabricated into various useful articles such as a diaper, a napkin, a table cloth, a bandage, a gauze, an underpant, a medical garment, a surgeon's gown, a cap, a mask, a surgical cover, a patient drape, a carpeting, a bedding material, an underwear, a sock, or a uniform. In other aspects of the current invention, the textile material can be a synthetic polymer or a blend of natural/synthetic, natural/natural, synthetic/synthetic. Suitable synthetic polymers include, but are not limited to, polyester (PET), polyethylene (PE), acrylic, nylon, polypropylene, and combinations thereof.

III. Nanoparticles

A wide range of nanoparticles are suitable for use in the present invention. The nanoparticles can be an organic nanoparticle, or an inorganic nanoparticle. The nanoparticles suitable for use in the present invention can be metal oxides such as $Fe_2O_3$, $SiO_2$, $Ag_2O$, $CuO$, and the like, nanosized metals such as Ag, Cu, Fe, Zn, inorganic pigments, organic pigments, insoluble polymers, and any solid materials that can be physically or chemically processed into a nanosize particle. In one preferred embodiment, the nanoparticle suitable for use in the present invention is carbon black.

In one embodiment, the nanoparticles useful in the present invention are described in U.S. Pat. No. 6,221,673, issued on Apr. 24, 2001, and incorporated herein by reference. As disclosed therein, each nanoparticle is a small cluster of conductive metal atoms that forms a metallic "core" surrounded by a thin "ligand shell" of relatively non-conductive material chemically (e.g., covalently) bound to the core. The cluster of metal atoms can be composed of a single conductive metal, or of atoms of two or more conductive metals. Examples are noble metals or other conductive metals such as copper, nickel and tin. The encapsulating ligand shell is advantageously an organic, inorganic or combined organic/inorganic substance. The ligand molecule typically has a head-tail type structure; the head is a functional group possessing a bonding interaction with metal atoms in the core surface, and the tail has a structure and composition designed to provide additional stabilization of metal clusters (i.e., core bodies) against irreversible agglomeration, induce solubility in solvents and promote interactions with chemical species of interest. The ligand shell can be a monomolecular or multimolecular layer. The ligand shell substance is advantageously a functionalized organic compound, such as a thiol, or an amine. The particles can be made from a wide variety of inorganic materials including metals or ceramics. Preferred metals include chromium, rubidium, iron, zinc, selenium, nickel, gold, silver, platinum. Preferred ceramic materials include silicon dioxide, titanium dioxide, aluminum oxide, ruthenium oxide and tin oxide. The core particles can be made form organic materials including carbon (diamond). Preferred polymers include polystyrene, nylon and nitrocellulose.

It is now possible to obtain in nanoparticle size a variety of particles made from ceramics, metal oxides, plastics, glasses and the like. U.S. Pat. No. 5,219,577 describes ruthenium oxide, tin oxide and glass nanoparticles which can be coated with cellobiose in forming a strong adhesive bond with glass ceramic nanostructures. These structures which can be derivatized, can be reacted with proteins, lipoproteins, glycoproteins, drugs, haptens, oligonucleotides and the like.

In certain instances, the nanoparticle processed textile and polymer systems of the present invention have an embedded nanoparticle which imparts a unique functionality into the textile. Suitable functionalities include by way of example, coloration, a waterproof finishing, soil repellent finishing, fire resistance finishing, wrinkle free finishing, anti-UV finishing, antimicrobial finishing, antiwarfare finishing, antibiowarfare and antistatic finishing. Other suitable functionalities are disclosed in U.S. Provisional Patent Application No. 60/280,687, filed Mar. 30, 2001, and which is incorporated herein by reference. Those of skill in the art will be aware of other desirable functionalities useful in the present invention.

Without being bound by any particular theory, it is believed that various aspects of the present invention are based upon the understandings of the diffusion of nanoparticles, the free volume and properties of fiber-forming polymers, the availability of nanosized particles, the formulations herein, the implementation of nanoparticles formulations, and combinations thereof.

Diffusion is a macroscopic motion of components of a system that arises from concentration differences. Dye diffusion from the surface to the inside of fibers can be described with Fick's law of diffusion (Equation 1).

$$dS/dt = -D(dC/dx) \quad (1)$$

wherein:

dS/dt is the rate of transfer per unit area of section;

D is the diffusion coefficient;

C is the concentration of the diffusant; and x is the space co-ordinate measured normal to the section.

Complete solutions to Fick's law present considerable computational power due to the number of variables involved. However, based upon some reasonable assumptions such as the consideration of fibers as circular in cross-section and infinite in length, the constant diffusion coefficient with temperature, the instantaneous equilibrium between the colorants in the system, and the uptake of pigment particles being controlled by diffusion, Fick's Law can be simplified. For example, if the nanosized colorants are deposited on surfaces of cylindrical fibers, the diffusion of the nanoparticles is determined by concentration difference, the size of the particles, and the free volumes in the amorphous regions in polymeric fibers, while amorphous polymers are considered as frozen liquids and possess free volumes for accepting other molecules.

Colorants and any other chemicals can enter into amorphous regions in a fiber-forming polymer, as these areas are disordered and have free volumes that result from long-range molecular motion and greater rotational freedom. In a preferred embodiment, the greater free volumes occur at a temperature above the polymer's glass-transition temperature (Tg). Although there are several versions of free-volume and related theories, the general idea in terms of the diffusion of dispersants in polymers is based upon several points such as: (1) diffusants are assumed to be hard spheres, which reside in holes; (2) free-volume (or cage, void, and hole) exits in between the polymer chains in the amorphous domain; (3) a diffusant can "jump" from the hole containing it to one of the neighboring holes under certain conditions when it is opened up and the size permits; (4) continuous diffusion will occur if another dispersant "jumps" into the hole where the one "jumped" from before it "jumps" back; and (5) the segmental movement of the polymer chains will increase the proportion of free-volume relative to the total volume and therefore, ease the diffusion of the diffusants in between polymer chains (see, P. R. Brady, *Rev. Prog. Coloration*, 22:58 (1992); C. A. Kimins et al., *Free Volume and Other Theories*, in *Diffusion in Polymers*, Ed. J. Crank, G. S. Park (Academic Press, New York, 1968); R. McGregor, *Diffusion and Sorption in Fibers and Films, Vol.* 1 (Academic Press, New York, 1974, p. 201); S. Putta, UCSD Dissertation, *Macro and Micro Analysis of Small Molecule Diffusion in Amorphous Polymers* (p 17–19)).

Heating the textiles under an elevated temperature properly selected can open up more free volumes in the polymers and also increase kinetic energy of particle movement, thus facilitating diffusion of colorants. In certain aspects, not all particles can diffuse into polymers since the free volume in the polymers is limited, particularly in size. However, the progress of nanotechnology has made nanosized pigment particles widely available.

IV. Formulations

In one embodiment, the present invention provides a nanoparticle formulation for textiles, the formulation comprising: a nanoparticle; a dispersant; and optionally a thickener. In one preferred aspect, the nanoparticle is present in about 5% to about 10 wt %; the dispersant is present in about 25% to about 50% by weight of the nanoparticle; and the thickener is present in about 0% to about 25% on weight nanoparticle. In an especially preferred embodiment, the thickener is present in about 0% to 5% on weight of nanoparticle.

In certain aspects, the dispersant can be an anionic surfactant, a cationic surfactant, a nonionic surfactant, a zwitterionic surfactant and combinations thereof. Suitable anionic surfactants include, but are not limited to, sodium dodecyl sulfate (SDS), and sodium dodecyl benzene sulfonate (SDBS). Suitable cationic surfactants include, but are not limited to, hexadecylbenzyldimethylammonium chloride ($C_{16}H_{33}PhCH_2(CH_3)_2N^+Cl^-$), hexadecyltrimethylammonium bromide, dodecyltrimethylammonium bromide, and cetylpyridinium chloride. Suitable polymer and nonionic surfactants include, but are not limited to, carboxymethyl cellulose sodium (CMC), polyvinyl alcohol (PVA), $RO(CH_2CH_2O)_xH(R=C_{13}$ to $C_{15}$, X=8, 10, 11), polyethylene glycol derivatives, polyethyleneimine (PEI), polyacrylic acid or its salts (e.g., polyacrylate), polycarboxylic acid or its salts (e.g., polycarboxylate).

In one embodiment, the dispersant is a polymeric dispersant such as polyacrylic acid, polyethylene glycol, polyethyleneimine, cellulosic derivatives, or salt thereof. Suitable salts include, but are not limited to, a polyacrylate, and a copolymeric carboxylate. Those of skill in the art will know of other polymeric dispersants suitable for use in the present invention.

In certain aspects, the nanoparticle formulations of the present invention further comprises a thickener. Suitable thickeners include, but are not limited to, starch, modified starch, modified cellulose (e.g., carboxymethyl cellulose, ethyl cellulose, and the like), polyvinyl acetate, polyvinyl alcohol, polyethylene glycol, polyacrylates, silicones, copolymers of vinyl polymers, and the like.

Advantageously, the formulations of the present invention provide stability and distribution of nanosized pigment particles in the medium in which they are applied. Without being bound by any particular theory, it is believed that aqueous pigment dispersions are stabilized through three main mechanisms i.e., electrostatic stabilization, steric stabilization, and their combination (see, for example, Th. F. Tadros, *Solid/Liquid Dispersions* "Academic Press, New York" (1987); D. H. Napper, *Polymeric Stabilization of Colloidal Dispersions* "Academic Press, New York" (1983)). Electrostatic stabilization by means of the formation of a charge double layer is based upon what is called "DLVO theory" and provided by the coulombic (repulsive) interactions that occur when two charged particles approach each other (see, E. J. Verway et al., *Theory of the Stability of Lyophobic Colloids* "Elsevier, Amsterdam" (1948)). Steric stabilization, proposed by Napper and other researchers, is also called polymeric stabilization and can be imparted by polymer molecules attached to the surface of the particles (see D. H. Napper, *Polymeric Stabilization of Colloidal Dispersions* "Academic Press, New York" (1983)). Another type of stabilization is the combination of electrostatic and steric, which has been termed electrosteric stabilization (see, D. H. Napper, *Polymeric Stabilization of Colloidal Dispersions* "Academic Press, New York" (1983); S. Creutz et al., *Prog. Org. Coat.*, 40:21 (2000); Ch. Schaller et al, *Prog. Org. Coat.*, 35:63 (2000); H. Spinelli, *Adv. Mater.*, 10(5):1215 (1998); S. Creutz, R. Jerome, *Langmuir*, 15:7145 (1999)). In practice, specially designed structured polymers such as block copolymers, graft copolymers, and/or polyelectrolytes are available to prepare various nanoparticle finely dispersed aqueous systems for the use in the present invention.

Specially designed polymers suitable for stabilizing nanoparticle well dispersed aqueous systems include block copolymers, graft copolymers, and polymeric electrolytes. For example, block copolymers suitable for use include, but are not limited to, two-block, triblock, and multiblock copolymers, and preferably the AB type such as MMA-b-MMA/MAA (wherein MMA is methyl methacrylate, MAA is methacrylic acid, and MMA/MAA is a copolymer of MMA and MAA, b is block) and BAB type such as MMA/MAA-b-MMA-b-MMA/MAA. Others include EHMA-b-EHMA/MAA (wherein EHMA is 2-ethylhexyl methacrylate), EHMA-b-LMA/MAA (wherein LMA is lauryl methacrylate), BMA-b-BMA/MAA (wherein BMA is n-butyl methacrylate), and BMA-b-BMA/DMAEMA/MAA (wherein DMAEMA is dimethylaminoethyl methacrylate, BMA/DMAEMA/MAA is a copolymer of BMA, DMAEMA, and MAA).

In general, graft copolymers are composed of a hydrophilic (or hydrophobic) backbone and a hydrophobic (or hydrophilic) phase or teeth. Suitable graft copolymers include, but are not limited to, PAA-graft-PS (PAA is polyacrylic acid, PS is polystyrene) and polyalkylene imine-graft-polyester. Polyelectrolytes include, but are not limited to, polystyrene sulfonic acid and its salt, poly 2-acrylamino-2-methyl-1-propane-sulfonic acid, polyvinylpyridine, poly 4-vinylpyridine-b-MA (wherein MA is methacrylate), and poly 4-vinylpyridine-b-EO (wherein EO is ethylene oxide) and the like.

In one embodiment, the formulations of the present invention comprise a surface-active agent. In certain aspects, the surface active agents play a role in bridging the textile polymers and nanoparticles (e.g., pigment nanoparticles). A wide range of dispersants, surface active agents or wetting agents are suitable for use in the present invention. These include, but are not limited to, anionic surfactants, cationic surfactants such as sodium dodecyl sulfate (SDS) and $C_{16}H_{33}PhCH_2(CH_3)_2NCl.H_2O$, polymeric dispersants such as polyacrylic acids and corresponding salts, i.e., polyacrylate, polyethylenimine, oxo alcohol, and copolymeric carboxylate, or their composites. In one preferred embodiment, surface active agents facilitate the transportation of pigment nanoparticles from the aqueous dyebath to the fibers. Besides the foregoing materials, various additives can optionally be added for evenness, fastness, and good hand considerations.

In one embodiment, a two-step ball milling technique in the presence of a dispersant or stabilizer and/or a wetting agent as previously mentioned, has been employed to obtain a pigment particle finely dispersed dyebath. Thickeners, a family of compounds normally having a long polyvinyl chain, are optionally added in the milling process in order to obtain a controllable flowrate and therefore, better serve the coloration purpose. Factors which can be considered in preparing pigment nanoparticle dyeing mixtures include the wetting of the raw pigments in an aqueous system, the deagglomeration and deaggregation of pigment powders, the stabilization of nanosized pigment particles, and the control of rheology of the fluid to be applicable to dyeing.

Various percentage of each of the components are used in the formulations of the present invention. In certain aspects, the amount of nanoparticle in the formulation is about 1% to about 20% w/w, and more preferably about 5% to about 10% w/w. In certain aspects, the amount of dispersant in the formulation is about 0.1% to about 10% w/w, and more preferably about 0.25%: to about 5% w/w. In certain aspects, the formulations optionally comprises an amount of a thickener in about 0% to about 25% w/w, and more preferably about 0% to about 5% w/w.

The particle size distribution of dry pigment powder is characterized by various methods known in the art. For example, the Brunauer-Emmett-Teller (BET) adsorption method or counting on a Scanning Electron Microscopy (SEM) photograph, while that of a dyeing formulation can be measured by, for example, Photo Correlation Spectroscopy (PCS) or Transmission Electron Microscopy (TEM). Rheological study of pigment formulations are focused on the effect of volume fraction of pigment powders, temperature, and additives on viscosity of the dyeing mixtures.

Color quality of the dyed fabrics is measured by, for example, a spectrophotometer based upon Kubelka-Munk theory that expresses how the optical properties of an opaque (infinitely thick) film relates to its absorbing and scattering components as shown in Eqn (7).

$$K/S_M=(aK_A+bK_B+cK_C+K_W)/(aS_A+bS_B+cS_C+S_W) \quad (7)$$

wherein:
K is the absorption coefficient;
S the scattering coefficient;
the subscript M refers to the mixture;
A, B, and C refer to the different dyes;
W means the substrate, i.e., the fabric; and
a, b, and c represent the concentration of each dye.

In case of only one kind of dye, "A" for example, being used and under the assumption of SW>>aSA+bSB+cSC, Eqn (7) reduces to:

$$K/S=a(K_A/S_W)+K_W/S_W \quad (8)$$

in which K/S values at different wavelengths are used to provide sets of simultaneous equations that can be solved for dyestuff concentrations, or the volume fractions of pigment nanoparticles. In practice, K/S values can be conveniently measured according to Eqn (9):

$$K/S=(1-R)^2/2R \quad (9)$$

wherein R is the reflectance of the sample at a given wavelength.

The diffusion coefficients of different pigment nanoparticles in different fabrics can be obtained through a multiple membrane method. Advantageously, one of the important features possessed by pigment nanoparticles, is the increased solubility with decreased size.

V. Methods

In one embodiment, the present invention provides a method for making a nanoparticle processed polymer composition, comprising: diffusing a nanoparticle into a polymer matrix to form an embedded nanoparticle in the polymer matrix, thereby making the nanoparticle processed polymer composition. In certain preferred embodiments, the nanoparticle imparts color in the polymer composition. The methods of the present invention are useful for imparting a wide range of colors into fabrics and textiles. Suitable colors include, but are not limited to, primary colors, white, black, red, orange, yellow, green, blue, purple and combinations thereof.

Various polymers are suitable for use in the present invention. Suitable polymers include, but are not limited to, a polyester, a polyamide, a polyethylene, a polypropylene, a polystyrene, a polyvinylchloride, a polyamideimide, a polyethersulfone, a polyarylsulfone, a polyetherimide, a polyarylate, a polysulfone, a polycarbonate a polystyrene, a polyetherketone, a polyetheretherketone, a polytetrafluoroethylene, a nylon-6,6, a nylon-6,12, a nylon-11, a nylon-12, a acetal resin, and an aramid. Other polymer fabrics such as cellulose, PET, acrylics, nylon, and the like are also suitable.

Various nanoparticles including pigments, both organic (e.g., azo and polycyclic) and inorganic (e.g., carbon black, iron oxide or oxid hydroxide, and the like) are suitable for use in the methods of the present invention. Embedding nanoparticles inside fibers can be effectuated using a simple dip-pad-dry method.

In certain preferred aspects, the nanoparticle diffuses at the glass-transition temperature of the polymer matrix. In one aspect, the free volume of the polymer matrix is greater in diameter than the nanoparticle. In one preferred aspect, the polymer matrix is heated above its glass transition temperature to facilitate the diffusion of the nanoparticle.

In certain aspects, the pigment mixture or formulation is applied to different sample fabrics by, for example, a dip-pad-dry operation with controlled pick-up rates of the pigment particles. Advantageously, coloration by a dip-pad process makes the production of wastewater low and simplifies the multiple operations of coloration of blend fabrics as a single-step, which further reduces the generation of wastewater.

After the preparation of the pigment nanoparticle dyeing bath, a dip-pad-dry method is used to apply the dyeing formulation to various textiles. In one embodiment, fabrics are first dipped into the dyeing bath and kept there for a certain time period to effectuate nanoparticle embeddness before padded with a padder. Fabrics are then treated in a repeated dip-and-pad process in iterative fashion. After the padding step, the fabrics are ready for dry treatments under various temperatures. In one embodiment, the formulation containing 5% (wt) pigment nanoparticle, 2.5% dispersant and a total liquor volume of about 20 to 40 mL can be applied to five pieces (5×10 cm) of fabrics such as cotton, PET/cotton, PET (disperse dyeable), acrylics and nylon. Both dip and pad processes are operated under room temperature and last for 2 minutes. All the fabrics are first dried at room temperature and then moved into an oven having a pre-set temperature of about 160° C.–180° C. and kept for about 5 to about 10 minutes.

In preferred embodiments, heat treatment is used. Heat treatment of the dyed fabrics provides conditions for both the "opening-up" of more free-volume inside the polymers and kinetic energy for the pigment nanoparticles moving from the surface of the fibers into the deeper layers. Concentration gradient, or difference of chemical potential in a general sense, between pigment particles onto surfaces and those inside fibers provides the driving force for the diffusion, while temperatures higher than Tgs (glass transition temperatures) of corresponding fiber-forming polymers present a relaxed, viscous flow-like matrix to facilitate the entrance and diffusion of pigment nanoparticles and enhance the kinetics as well. After the elimination of dispersants, pigment nanoparticles with high surface energy and poor interactions with fibers aggregate spontaneously and are entrapped inside the fibers to "permanently" color the fabric with fastness.

In another aspect, the present invention provides a method for dyeing a textile having a polymeric matrix, the method comprising: diffusing a colored nanoparticle into a textile having a polymer matrix to form an embedded colored nanoparticle in the textile having the polymer matrix, thereby dyeing the textile. In certain aspects, the colored nanoparticle diffuses at the glass-transition temperature into the polymer matrix, when, for example, the free volume of the polymer matrix is greater in diameter than the colored nanoparticle.

EXAMPLES

Example 1

This example shows that the size of pigment particles and the process temperature in the coloration of a polymer.

Figure 2:
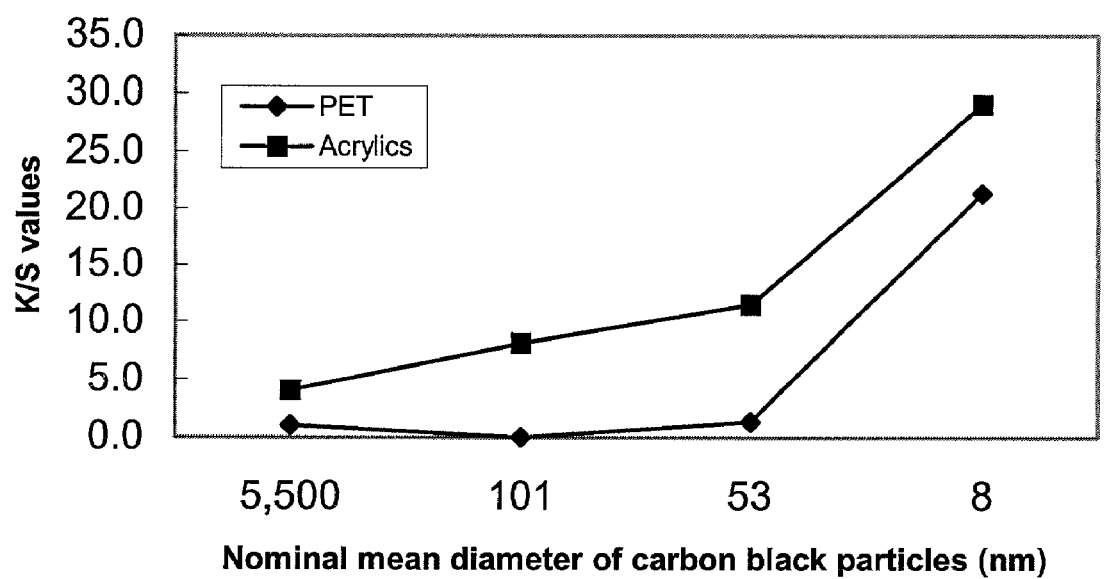
FIG. 2 illustrates the nominal mean diameter of carbon black nanoparticles useful in the present invention.

K/S measurement to evaluate color levels of treated fabrics were used, with higher K/S values showing darker colors. FIG. 2 illustrates the impact of the size of pigment particles on the color. In certain aspects, smaller particle size has a better effect, and when the particle size was reduced to around 8 nm from 53 nm, the K/S values were at least tripled, which is a clear sign of diffusion of nanoparticles into polymers.

Figure 3:
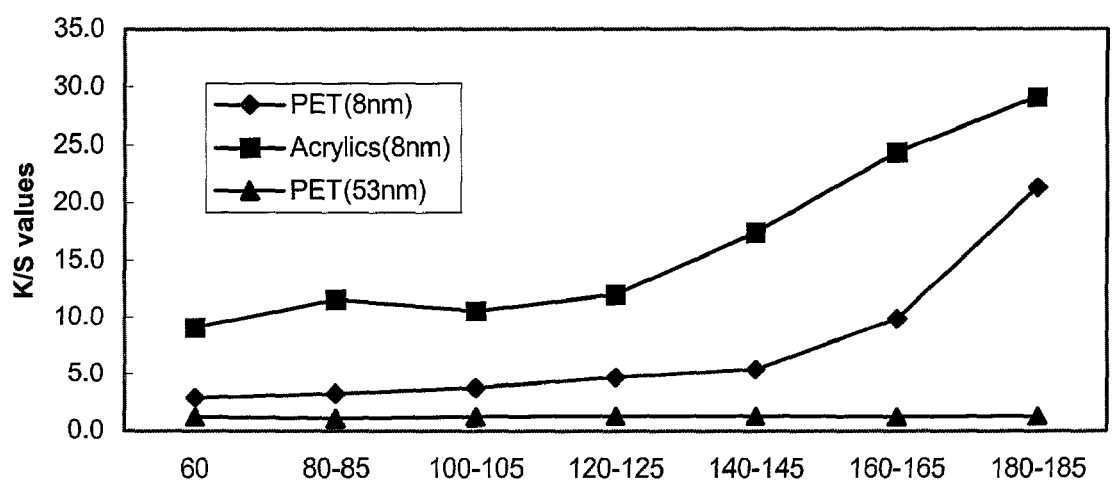
FIG. 3 shows the temperature effect in one embodiment of the present invention with different nanoparticles.
Figure 4:
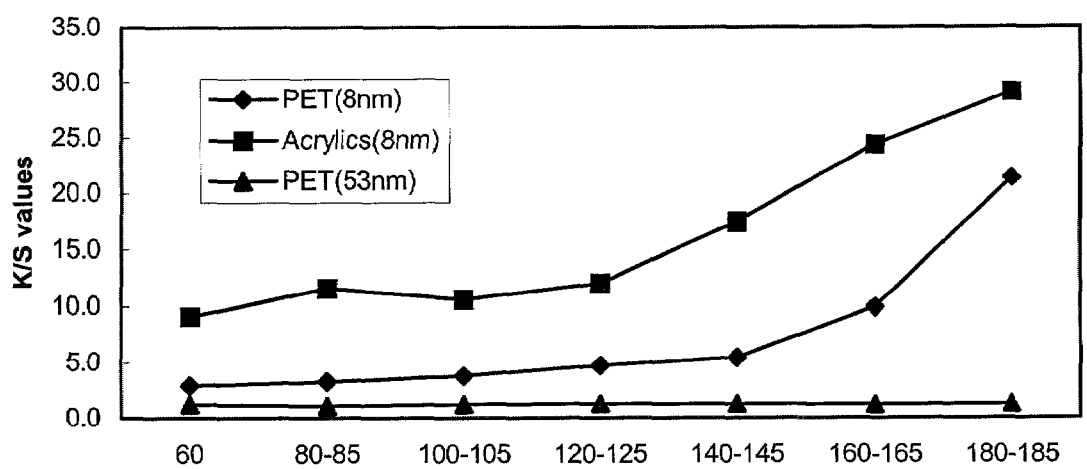
FIG. 4 shows K/S valves for various color qualities of dyed fabrics.

As shown in FIG. 3, in certain aspects, the heating temperature is important in the diffusion of the nanoparticle. When the size of nanoparticles is at 8 nm level, the K/S values were significantly higher than that of the size at 54 nm, and increased as the temperature was raised particularly at above 140° C.

These results show that small particles can diffuse into polymers where there are free-volumes that can accept these particles if the particles are small enough and delivered on the surface of fibers at a higher concentration and heated under an elevated temperature.

Functional polymers and textiles are the needs of new materials, but are limited in availability. Such a result is largely due to the limitation of technologies in making the novel materials, more specifically due to the lack of methods that can chemically or physically modify existing polymers. Advantageously, the present invention provides nanoparticle treatment of fibers that deliver foreign chemicals, particularly functional ones, into commercially available polymers in a controlled way without significantly affecting chemical structures of the materials.

TABLE 1

K/S vs pigment particle size

| Nominal Mean Diameter (nm) | PET (disperse dyeable) | | | Acrylics | | |
|---|---|---|---|---|---|---|
| | 1-cycle | 5-cycle | 10-cycle | 1-cycle | 5-cycle | 10-cycle |
| [a]5500 | 1.9 | 1.0 | N/A | 5.9 | 4.0 | N/A |
| [b]101 | 5.0 | [c]0.9 | N/A | 33.3 | 8.1 | 6.0 |
| [b]53 | 9.8 | 1.3 | N/A | 10000.0 | 11.5 | 7.9 |
| [b]8 | 10000.0 | 21.3 | 7.8 | 10000.0 | 29.1 | 15.4 |

[a]De. Carbon 10 wt %, Pig./Surf. = 2/1 (wt);
[b]Pig. 5% (wt), Pig./Surf. = 2/1, Surf. = +;
[c]After 4-cycle washing 185° C. treatment

TABLE 2

K/S vs temperature with nominal mean pigment particle size at 8 nm

| Temperature of treatment (° C.) | PET (disperse dyeable) | | | Acrylics | | |
|---|---|---|---|---|---|---|
| | 1-cycle | 5-cycle | 10-cycle | 1-cycle | 5-cycle | 10-cycle |
| 60 | 97.0 | 2.9 | 1.5 | 207.3 | 9.1 | 6.3 |
| 80–85 | 57.0 | 3.3 | 1.7 | 141.9 | 11.6 | 7.0 |
| 100–105 | 67.5 | 3.8 | 2.2 | 75.9 | 10.6 | 7.3 |
| 120–125 | 42.6 | 4.7 | 2.5 | 77.1 | 12.0 | 7.3 |
| 140–145 | 67.1 | 5.4 | 2.6 | 2499.0 | 17.4 | 9.7 |
| 160–165 | 7916.3 | 9.9 | 4.9 | 6624.0 | 24.3 | 12.9 |
| 180–185 | 10000.0 | 21.3 | 7.8 | 10000.0 | 29.1 | 15.4 |

8 nm, Pig. 5% (wt), Pig./Surf. = 2/1 (wt), Surf. = +

TABLE 3

K/S vs temperature with nominal mean pigment particle size at 53 nm

| Temperature of treatment (° C.) | PET (disperse dyeable) | | | Acrylics | | |
|---|---|---|---|---|---|---|
| | 1-cycle | 5-cycle | 10-cycle | 1-cycle | 5-cycle | 10-cycle |
| 60 | 11.5 | 1.2 | N/A | 20.1 | 3.0 | 1.9 |
| 80–85 | 12.2 | 1.1 | N/A | 14.6 | 2.8 | 2.0 |
| 100–105 | 15.0 | 1.2 | N/A | 20.3 | 3.2 | 2.1 |
| 120–125 | 11.6 | 1.3 | N/A | 28.2 | 3.8 | 2.5 |
| 140–145 | 10.7 | 1.3 | N/A | 53.4 | 3.9 | 2.8 |
| 160–165 | 4.3 | 1.2 | N/A | 46.2 | 5.3 | 3.8 |
| 180–185 | 9.8 | 1.3 | N/A | 10000.0 | 11.5 | 7.9 |

53 nm, Pig. 5% (wt), Pig./Surf. = 2/1 (wt), Surf. = +

TABLE 4

K/S vs temperature with nominal mean pigment particle size at 101 nm

| Temperature of treatment (° C.) | PET (disperse dyeable) | | | Acrylics | | |
|---|---|---|---|---|---|---|
| | 1-cycle | 4-cycle | 10-cycle | 1-cycle | 5-cycle | 10-cycle |
| 60 | 13.9 | 0.9 | N/A | 9.3 | 2.1 | 1.4 |
| 80–85 | 11.0 | 0.9 | N/A | 8.8 | 1.7 | 1.3 |
| 100–105 | 10.8 | 0.8 | N/A | 12.3 | 1.9 | 1.4 |
| 120–125 | 10.3 | 0.9 | N/A | 18.5 | 2.4 | 1.7 |
| 140–145 | 8.4 | 0.9 | N/A | 15.0 | 2.3 | 1.8 |
| 160–165 | 2.8 | 0.8 | N/A | 14.5 | 3.0 | 2.2 |
| 180–185 | 5.0 | 0.9 | N/A | 33.3 | 8.1 | 6.0 |

101 nm, Pig. 5% (wt), Pig./Surf. = 2/1 (wt), Surf. = +

TABLE 5

K/S vs the ratio of pigment to surfactant with nominal mean pigment particle size at 8nm

| Pigment wt % (Pig./Surf.) | PET (disperse dyeable) | | | Acrylics | | |
|---|---|---|---|---|---|---|
| | 1-cycle | 5-cycle | 10-cycle | 1-cycle | 5-cycle | 10-cycle |
| 10% (4/1) | 276.8 | 8.5 | 4.2 | 237.1 | 12.3 | 9.6 |
| 5% (2/1) | 10000.0 | 21.3 | 7.8 | 10000.0 | 29.1 | 15.4 |
| 10% (2/1) | 10000.0 | 15.0 | 6.6 | 10000.0 | 39.0 | 33.3 |

8 nm, 185° C. treatment, Surf. = +
Note:
De. Carbon = Decolorizing carbon;
Surf. = Surfactant;
Pig. = Carbon black nanoparticles;
+ = $C_{16}H_{23}PhCH_2(CH_3)_2NClH_2O$;
Dyeing mixtures were prepared simply by stirring.

Example 2

This example describes the making of a formulation of the present invention.

In the first step, 1 g of $C_{16}H_{33}PhCH_2(CH_3)_2N^+Cl^-\cdot H_2O$ and 17 g of distilled water were well mixed to prepare a solution. In the second step, 2 g dry pigment nanoparticles (Raven 5000UII carbon black, from Columbia Chemicals)

were ball-milled for 30 minutes by using an 8000 SPEX Mixer/Mill and the corresponding steel vial. All the balls were ½ in. stainless steel beads and the ratio of beads to powder is about 15:1. Next, the solution prepared in the first step was poured into the vial that contained the dry-milled powder in the second step after the dry milling, and then milled for another 30 minutes. This process is called a two-step milling that is composed of one dry milling and one wet milling. The formulation made this way is ready for a dip-pad-dry operation.

TABLE 6

Resistively measurements (Ohm)

| | Bare Fabrics | Dyed Fabrics* |
|---|---|---|
| Cotton** | $1.0 \times 10\exp10$ | $1.0 \times 10\exp9$ |
| PET/Cotton** | $2.5 \times 10\exp10$ | $1.7 \times 10\exp9$ |
| PET (Disperse dyeable)*** | $1.0 \times 10\exp13$ | $1.0 \times 10\exp8$ |
| Acrylics** | $>1.0 \times 10\exp13$ | $2.5 \times 10\exp8$ |

*Raven 5000UII carbon black (8 nm) as Pig., Pig.5% (wt), Pig./Surf. = 2/1 (wt), Surf. = +;
**160° C. treatment, after 1-cycle washing;
***180° C. treatment, after 1-cycle washing.

The resistively measurements in Table-6 indicate the following:

1) Both cotton and PET/cotton fabrics do not change significantly in their resistively values because both fabrics contain a cotton component, and the moisture absorption of cotton fibers plays an essential role in determining the conductivity of the whole fabric; the equal to or less than one order of magnitude decrease from bare cotton and PET/cotton fabrics to dyed cotton and PET/cotton fabrics is due to the uptake of carbon black nanoparticles;

2) The slight decrease of resistively values from both bare and dyed PET/cotton to pure cotton are due to the blending of PET fibers, a type of hydrophobic polymer, which reduce the absorption of moisture;

3) The dramatic decrease of resistively values (>10 exp 5) of both PET and acrylics from the bare fabrics to their dyed counterparts are attributed to the incorporation of carbon black nanoparticles.

Example 3

This example compares the embedded nanoparticle of the present invention versus the blending of nanoparticles with polymers.

Figure 5:
FIGS. 5A–B show nanoparticles blended with polymers or other technologies that can mix nanoparticles with polymers; Panel A shows a portion of a cross-section of a polymer film surface showing diffusion of nanoparticles into a polymer film applying the particles from the top surface and Panel B shows a top cross-sectional view of diffusion of nanoparticles into a polymer fiber by applying the nanoparticles from the fiber surface.
Figure 5:
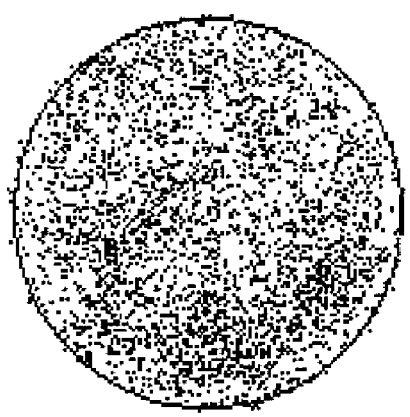

As shown in FIGS. 5A–B, when nanoparticles are blended or mixed with polymers, the nanoparticles diffuse throughout the film, polymer or fibers. The nanoparticles do not diffuse into the film, polymer or fibers, but evenly impregnate the film, polymer or fiber to generate a distributed nanoparticle. In sharp contrast, as is illustrated in FIG. 1A, in the textiles of the present invention, the nanoparticle are embedded with the majority of the nanoparticle closely packed just below the surface of the polymer or fiber.

All publications, patents and patent applications mentioned in this specification are herein incorporated by reference into the specification in their entirety for all purposes. Although the invention has been described with reference to preferred embodiments and examples thereof, the scope of the present invention is not limited only to those described embodiments. As will be apparent to persons skilled in the art, modifications and adaptations to the above-described invention can be made without departing from the spirit and scope of the invention, which is defined and circumscribed by the appended claims.

What is claimed is:

1. A nanoparticle processed textile and polymer system, said nanoparticle processed textile and polymer system comprising:
    a textile material having an embedded nanoparticle by diffusion, wherein said embedded nanoparticle is distributed in a gradually diluted pattern, having a higher density at or near the surface of said textile and polymer system and gradually decreasing density toward the core; and
    wherein said nanoparticle is carbon-black.

2. The nanoparticle processed textile and polymer system of claim 1, wherein said textile material is a member selected from the group consisting of fabric, yarn and fiber.

3. The nanoparticle processed textile and polymer system of claim 1, wherein said textile material is a member selected from the group consisting of cellulose, cotton, linin, hemp, jute, ramie, wool, mohair, vicuna, silk, rayon, lyocell, acetate, triacetate, azlon, acrylic, aramid, nylon, olefin, polyester, spandex, vinyon, vinal, graphite, metallic textiles, ceramic textiles and mixtures thereof.

4. The nanoparticle processed textile and polymer system of claim 2, wherein said textile material is a fabric selected from the group consisting of cellulose, cellulose-synthetic blend, and synthetic material.

5. The nanoparticle processed textile and polymer system of claim 4, wherein said textile material is cellulose.

6. The nanoparticle processed textile and polymer system of claim 5, wherein said cellulose material is fabricated into a member selected from the group consisting of a diaper, napkin, a table cloth, a bandage, a gauze, an underpants, a medical garment, a surgeon's gown, a cap, a mask, a surgical cover, a patient drape, a carpeting, a bedding material, an underwear, a sock, and a uniform.

7. The nanoparticle processed textile and polymer system of claim 4, wherein said textile material is a synthetic polymer selected from the group consisting of PET, acrylic and nylon.

8. The nanoparticle processed textile and polymer system of claim 1, wherein the size of said nanoparticle is about $10^{-9}$ m to about $10^{-7}$ m.

9. The nanoparticle processed textile and polymer system of claim 1, wherein said embedded nanoparticle imparts a functionality selected from the group consisting of coloration, a waterproof finishing, soil repellent finishing, fire resistance finishing, wrinkle free finishing, anti-UV finishing, antimicrobial finishing and antistatic finishing.

10. The nanoparticle processed textile and polymer system of claim 1, wherein at least 60% of said embedded nanoparticle are distributed at or near the surface of said textile and polymer system.

11. The nanoparticle processed textile and polymer system of claim 1, wherein between 70–80% of said embedded nanoparticles are distributed at or near the surface of said textile and polymer system.

12. The nanoparticle processed textile and polymer system of claim 1, wherein between 80–90% of said embedded nanoparticles are distributed at or near the surface of said textile and polymer system.

* * * * *